March 15, 1966    H. G. BLANK ETAL    3,240,990
DISPLAY DEVICE

Filed Aug. 28, 1963      3 Sheets-Sheet 1

INVENTORS.
HANS G. BLANK
MOE WASSERMAN
BY
R. J. Frank
ATTORNEY.

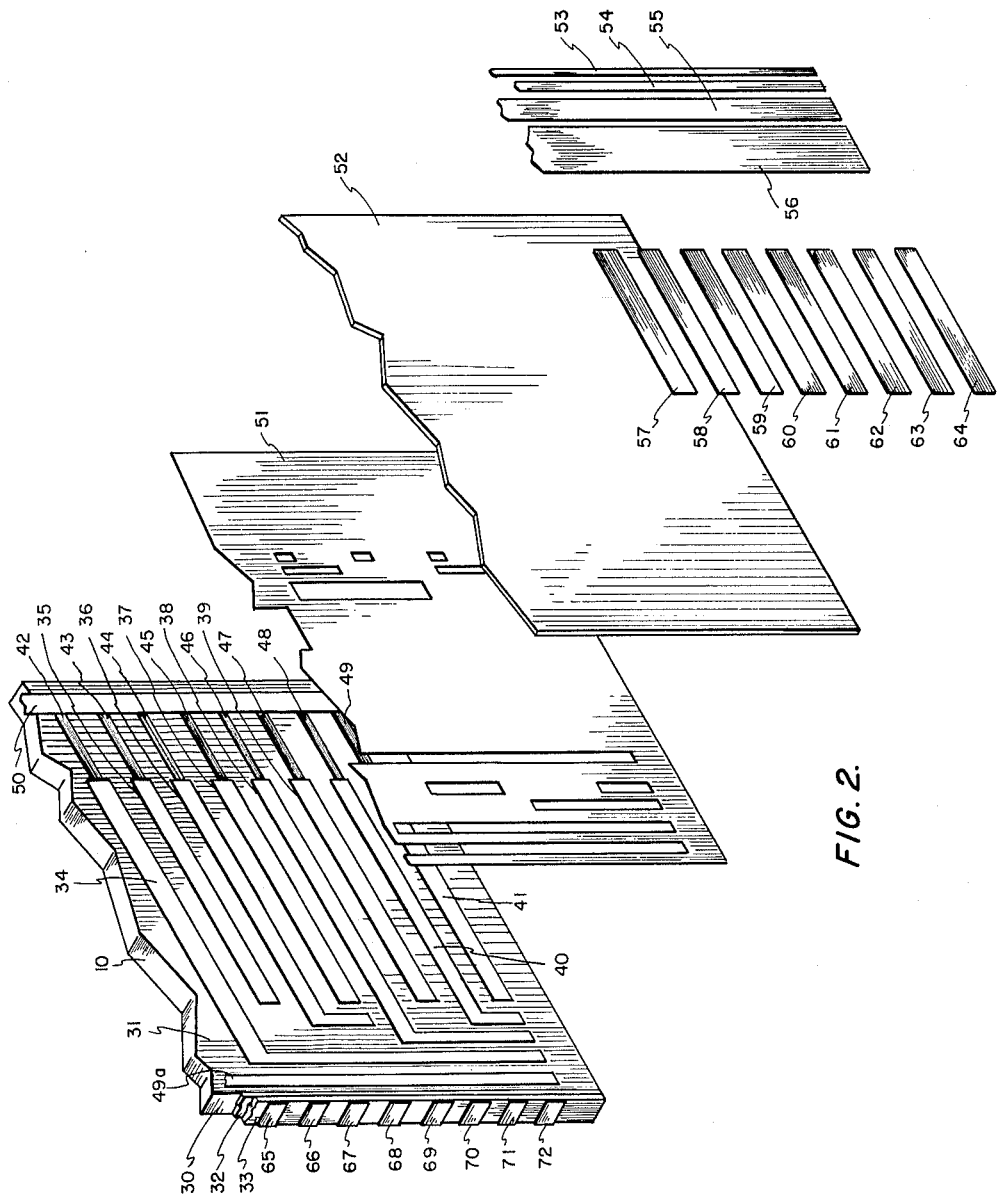

March 15, 1966   H. G. BLANK ETAL   3,240,990
DISPLAY DEVICE

Filed Aug. 28, 1963   3 Sheets-Sheet 3

INVENTORS.
HANS G. BLANK
MOE WASSERMAN
BY
R. J. Frank
ATTORNEY.

3,240,990
DISPLAY DEVICE
Hans G. Blank, Bronx, and Moe Wasserman, Glen Head, N.Y., assignors to General Telephone and Electronics Laboratories, Inc., a corporation of Delaware
Filed Aug. 28, 1963, Ser. No. 305,050
9 Claims. (Cl. 315—169)

This invention relates to display devices and in particular to display devices of the type wherein the length of an indicator corresponds to the quantity being measured.

Display devices in which information is presented in the form of bar graphs have potentially wide application in industrial process controls, air craft instrumentation and, in general, in systems which require that a large number of devices be located on a relatively small instrument panel. Such display devices should have the capability of responding rapidly to digital input signals, require a minimum amount of space, and should function properly under a wide variety of environmental conditions.

Accordingly, we have invented an improved bar type display which meets the above requirements. Specifically, it is an object of our invention to provide an integrated display device which is compact, employ solid state components, has no moving parts, and is operable over a wide temperature range.

Another object of our invention is to provide a solid state display device in which information is presented in the form of an illuminated bar.

Still another object is to provide a bar type display device which responds to binary input signals.

Our display device is an integrated unit in which a binary signal applied to a set of input terminals is displayed as a bar of light having a length proportional to the magnitude of the input signal. The device comprises a thin, flat non-conducting substrate having an electroluminescent indicator forming one of the narrow edges. Circuitry for electrically coupling an applied digital input signal to the electroluminescent indicator is deposited on one surface of the substrate.

The electroluminescent indicator is provided with a phosphor layer interposed between a common electrode and a plurality of electrode segments uniformly distributed in a ladder-like array along the edge of the substrate. When a voltage is applied between the common electrode and any one of the electrode segments, the portion of the electrode layer under that segment emits light. When all of the segments are energized the entire bar appears illuminated, the length of the bar being correspondingly decreased as fewer segments are energized.

The translator circuitry for coupling a binary input signal to the electroluminescent indicator comprises a layer of electrically non-linear material and an insulating mask interposed between two groups of electrodes. The electrically non-linear material is of the type wherein the electrical resistance decreases as the voltage applied across the layer increases. Stated another way, the current through any selected portion of the layer in either direction varies according to the equation $I=kV^n$, where I is the current through the non-linear layer, V is the voltage across the selected portion of the layer, k is a constant and n is a number greater than 1.

The first group of translator electrodes is divided into an input section and an output section. The input section consists of m spaced electrodes extending generally in a first direction along one surface of the non-linear resistance layer, where m is the maximum number of bits in the input signal. The output section consists of a maximum of $2^m-1$ spaced electrodes extending in a second direction substantially perpendicular to the first direction along the same surface of the non-linear resistance layer. Each of the output electrodes is electrically coupled to a corresponding one of the electroluminescent indicator electrode segments mounted on the edge of the substrate.

The second group consists of a number of spaced electrodes equal to the number of output electrodes. A first portion of each of the electrodes in the second group extends in the second direction passing under the input electrodes and a second portion of certain of the electrodes in the second group extends in the first direction passing under the output electrodes.

The insulating mask, which is interposed between one of the groups of electrodes and the non-linear resistance layer has openings at predetermined locations (termed cross-over points) to provide electrical connections between selected first and second group electrodes. As a result, the particular first and second group electrodes at the cross-over points are electrically coupled through the portion of the non-linear layer situated between them. The locations of the openings in the mask determine which of the electrode segments on the electroluminescent indicator will be energized in response to a particular input signal.

In our display device, the openings in the mask are so positioned in relation to the first and second group electrodes that the electroluminescent indicator segment corresponding to a given binary input signal is energized together with all segments below it thereby producing what appears to be a solid bar of light having a length proportional to the magnitude of the binary input signal.

The above objects of and the brief introduction to the present invention will be more fully understood and further objects and advantages will become apparent from a study of the following description in connection with the drawings, wherein:

FIG. 2 is an exploded view showing a simplified version of the display device of FIG. 1;

Figure 1:
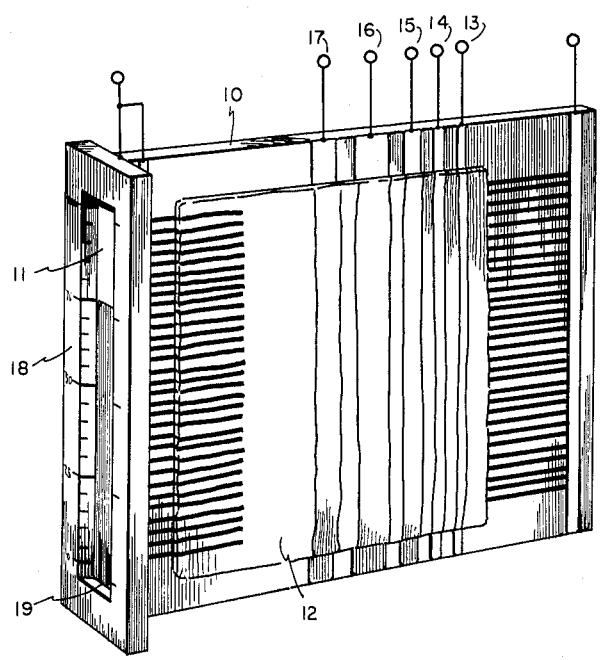
FIG. 1 is a perspective view of our integrated bar type display device.

FIG. 1 is an overall perspective view of the bar display device removed from its panel mounting. As shown, it is comprised generally of a thin, flat non-conductive glass substrate 10, an electroluminescent indicator 11 secured to one edge of substrate 10, and a translator 12 for coupling a binary input signal applied to terminals 13, 14, 15, 16 and 17 to indicator 11. A calibrated scale 18, affixed to the edge of panel 10, indicates the magnitude of the applied input signal.

As will be described in more detail hereinafter, the indicator 11 consists of a strip of electroluminescent phosphor deposited on an electrically conductive coating secured to the edge of substrate 10. By means of transparent conductive electrodes affixed to the surface of the phosphor strip, a selected portion of the strip is caused to emit light in accordance with the signal applied to input terminals 13–17. That is, when the device is energized a bar of light extends from the lower end 19 of the indicator to a height determined by the magnitude of the input signal.

For example, the device shown in FIG. 1 is designed to display input signal levels having magnitudes up to binary 11111. When no signal is applied to terminals 13–17, indicator 11 is dark and when a signal having a magnitude of binary 11111 (corresponding to decimal 31) is applied, the entire indicator is illuminated. For signals of intermediate magnitude, a portion of the bar from the lower end 19 of the indicator to a point corresponding to the magnitude of the input signal emits light. While the particular device shown in FIG. 1 is provided with only five input terminals and is therefore restricted to displaying signals having no more than thirty-one discrete levels, the actual number of levels which may be displayed is limited only by the permissible size of the substrate and the spacing of the components.

Figure 3:
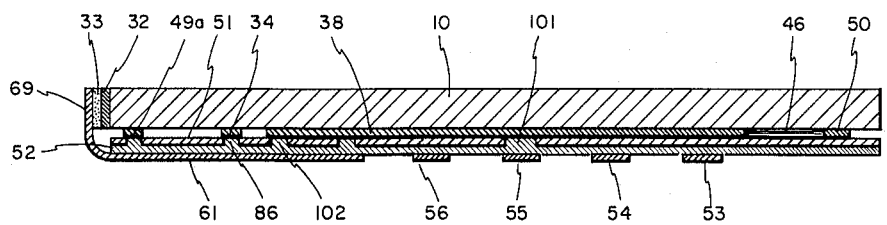
FIG. 3 is a cross-sectional view of FIG. 2.

Details of the construction of the display device are shown in the exploded view of FIG. 2 and the cross-sectional diagram of FIG. 3. The illustrated device is similar to that shown in FIG. 1 except that the number of input electrodes has been decreased to four and the number of output electrodes has been reduced to eight in order to more distinctly illustrate the invention.

As indicated in the exploded view of FIG. 2, the display device consists essentially of a number of layers having different electrical characteristics deposited on edge 30 and surface 31 of substrate 10. A conductive coating 32 is deposited directly on the edge 30 of substrate 10 and a strip 33 consisting of an electroluminescent phosphor is secured to coating 32. The composition of the electroluminescent phosphor is determined by the indicator color desired, it being found that zinc sulfide activated by copper and chlorine produces an excellent green-emitting electroluminescent phosphor and that other colors can be obtained by using other known electroluminescent phosphors.

A group of parallel, spaced electrodes 34-41 is deposited on the surface 31 of substrate 10 and electrically connected to deposited carbon film resistors 42-49. As shown, electrodes 35, 37, 39 and 41 extend only in a direction perpendicular to edge 30. Electrodes 34, 36, 38 and 40, on the other hand, have a first portion which is parallel to electrodes 35, 37, 39 and 41 and a second portion which extends in a direction perpendicular to those electrodes. A shunting electrode 49a and a voltage supply bus 50 are deposited on substrate 10, bus 50 being electrically connected to resistors 42-49.

An insulating mask 51, which may be formed from a glass enamel, is placed over the electrodes on the surface 31 of substrate 10, apertures being provided in this mask at predetermined locations. A layer 52 of electrically non-linear material is deposited over mask 51, the material passing through the apertures in the mask contacting the exposed portions of the electrodes deposited on substrate 10. Layer 52 may be composed, for example, of a settled layer of cadmium sulfide powder and epoxy resin of the type disclosed in greater detail in copending U.S. patent application Serial No. 72,789 filed November 30, 1960, by S. Yando.

A set of spaced, parallel input electrodes 53, 54, 55 and 56 are secured to electrically non-linear layer 52 and extend in a direction parallel to the edge 30. Each of these electrodes is in registration with a set of corresponding apertures in mask 51 which, in turn, are in registration with related electrodes from the group consisting of electrodes 34-41. The exact relationship between the apertures in mask 51 and electrodes 34-41 and 53-56 will be explained in connection with the description of FIG. 4. It shall be noted, however, that the apertures in mask 51 permit selected electrodes in the group 34-41 to be electrically connected to selected input electrodes in the set 53-56 through non-linear layer 52.

A set of spaced parallel output electrodes 57-64 is secured to layer 52 and a set of transparent spaced parallel electrode segments 65-72 is affixed to electroluminescent phosphor strip 33. The ends of electrodes 57-64 are in registration with the ends of electrodes 65-72 making direct electrical contact therewith and the surfaces of electrodes 57-64 are in registration with electrodes 34-41. Electrodes 57-64 are electrically coupled to electrodes 34-41 through non-linear layer 52 at points determined by the locations of the apertures in mask 51.

Transparent electrodes 65-72 are formed preferably of a thin layer of tin oxide. This material may also be used for the remainder of the electrodes on the display device, although other materials, such as vapor deposited gold or aluminum may be used.

Figure 4:
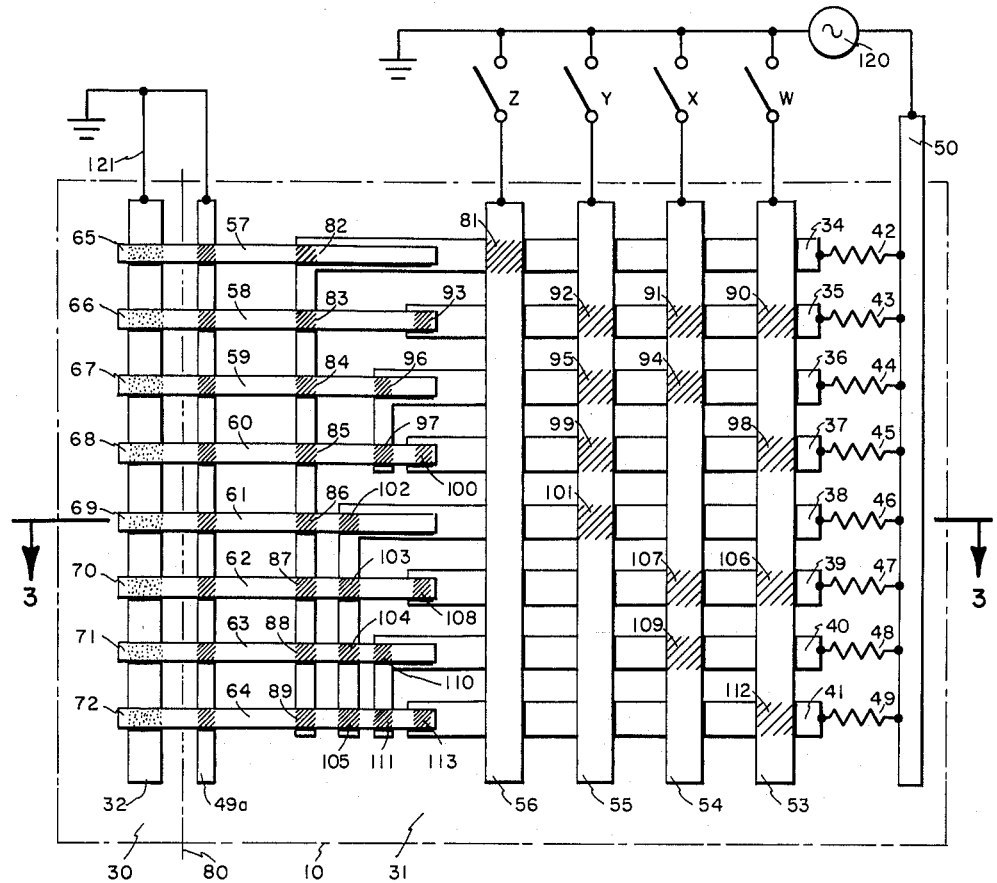
FIG. 4 is a partially schematic diagram of the display device useful in explaining its operation.

FIG. 4 is a plan view shown partially in schematic form illustrating the spatial relationship between the various electrodes and the openings in mask 51. For clarity, edge 30 of substrate 10 is shown in the same plane as surface 31, the dashed line 80 indicating the intersection betwen edge 30 and surface 31. The cross-over points at which electrodes on opposite sides of non-linear layer 52 are electrically connected through layer 52 and the apertures in mask 51 are indicated by cross-hatched squares, the electrodes being insulated from each other at all other points. Thus, electrode 34 is coupled by non-linear layer 52 to electrodes 56-64 at cross-over points 81-89 respectively through corresponding apertures in mask 51. Similarly, electrode 35 is coupled to electrodes 53-55 and 58 at cross-over points 90-93 respectively, electrode 36 to electrodes 54, 55, 59, and 60 at cross-over points 94-97, electrode 37 to electrodes 53, 55 and 60 at cross-over points 98-100, electrode 38 to electrodes 55 and 61-64 at cross-over points 101-105, electrode 39 to electrodes 53, 54 and 62 at cross-over points 106-108, electrode 40 to electrode 54, 63, and 64 at cross-over points 109-111 and electrode 41 to electrodes 53 and 64 at cross-over points 112 and 113.

The portions of the electroluminescent layer 33 subtended between electrodes 65-72 and common electrode 32 are indicated on FIG. 4 by the dotted areas. Also, carbon film resistors 42-49 are indicated for simplicity by the standard electrical symbol for resistors.

As previously explained, the transparent electrode segments 65-72 are energized in accordance with external binary signals applied to input electrodes 53-56. The external device which produces these signals is simulated in FIG. 4 by switches W, X, Y and Z, an open switch representing a binary "1" and a closed switch a binary "0." If all of the switches are closed, the indicator segments 65-72 are at too low a voltage with respect to common electrode 32 to excite the electroluminescent layer. Conversely, with all switches open, all of the segments are energized and the portions of the electroluminescent layer under each transparent segment emits light.

When an input signal of intermediate magnitude is applied to the display device, the transparent segment corresponding to that magnitude is energized as are all of the segments below it. For example, if switches W and Z are closed and switches X and Y are open thereby applying a signal having a binary value 0110 (decimal 6) to the device, six segments 67, 68, 69, 70, 71 and 72 are energized. This results in a bar of light being displayed having a height representing the magnitude of the input signal. (In FIG. 4, the ladder-like array of segments 65-72 has been widely spaced for clarity. However, in an actual device, the electrode segments would be close enough together to produce the appearance of a solid illuminated bar. In one practical device of this kind, for example, there are 25 segments to the inch and a total of 95 segments on a substrate 4½ inches by 5 inches by ⅛ inch.)

Segments 65-72 of the electroluminescent indicator are energized by an external alternating voltage source 120 connected between the supply bus 50 and common electrode 32. When switches W, X, Y and Z are all open, the voltage across the cross-over points between electrode 34-41 and 57-64 respectively is high enough to produce a substantial reduction in the resistance of the non-linear layer 52 at these points. As a result, the voltage impressed between each of the electrode segments 65-72 and electrode 32 is high enough to cause the electroluminescent layer beneath these segments to emit light. If now, the switches W, X, Y and Z are all closed, the input electrodes 53-56 connected to the closed switches are grounded. Consequently, the voltages across the portions of the non-linear layer 52 at the cross-over points between the grounded input electrodes 53-56 and electrodes 34-41 are high enough to substantially reduce the resistances of those portions of the layer. As a result, a low resistance path is effectively shunted between each of segments 65–72 and ground thereby reducing the voltage across the electroluminescent layer to a value below that required for emission of light.

For example, with the binary input 0110 (decimal 6) produced by closing switches W and Z and opening switches X and Y, electrodes 53 and 56 are grounded. Since electrode 56 is grounded, the resistance of non-linear layer 52 at cross-over point 81 is reduced thereby effectively shunting cross-over point 82 and the electroluminescent layer between segment 65 and electrode 32 to ground. As a result, the phosphor under segment 65 is not energized and no light is emitted. Similarly, the grounding of electrode 53 by switch W decreases the resistance at cross-over point 90 thereby shunting the path consisting of cross-over point 93 and the electroluminescent layer under segment 66. Thus, no light emission is obtained from the phosphor under segment 66.

Electrodes 36, on the other hand, is at a higher potential than either electrodes 34 or 35 because input electrodes 54 and 55 are ungrounded and there is no shunt path through cross-over points 94 and 95. Consequently, the resistance of the non-linear layer at cross-over point 96 is decreased due to the relatively high voltage across it and the voltage between segment 67 and electrode 32 is sufficient to produce emission of light from the portion of the electroluminescent layer under segment 67. Segment 68 is also at a high enough voltage with respect to electrode 32 to energize the electroluminescent layer beneath it since the resistance of non-linear layer 52 at cross-over point 97 is decreased as a consequence of the high voltage on electrode 36. It shall be noted that segment 68 is not energized through cross-over point 100 since the voltage on electrode 37 is decreased by the grounding of electrode 53 with consequent reduction of the resistance of the non-linear layer at cross-over point 98.

Similarly, the remaining segments 69, 70, 71 and 72 are energized through cross-over points 102–105. This is because switch Y is open, electrode 55 is ungrounded, the resistance of layer 52 at cross-over point 101 is high as is the voltage on electrode 38, and therefore the resistances at points 102–105 are decreased. It shall be noted that an additional circuit for energizing segments 71 and 72 is also provided through cross-over points 110 and 111.

Although only eight electrode segments 65–72 are shown for clarity in FIGS. 2 and 4, it will be appreciated that with four input electrodes a total of 15 segments can be energized by an extension of the translator structure. Additional details on the theory of operation of a non-linear translator of this type is given in copending U.S. patent application Serial No. 242,428, filed December 5, 1962 by Hans G. Blank.

The portions of non-linear resistance layer 52 between output electrodes 57–64 and electrode 49a is shunted directly between segments 65–72 respectively and electrode 32. These non-linear resistors equalize the voltage across the electroluminescent layer beneath segments 65–72 to provide uniform brightness over the entire display area.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:
1. A display device comprising
   (a) a substrate having a narrow edge and a flat surface extending substantially perpendicular to said edge,
   (b) an indicator secured to the narrow edge of said substrate, said indicator including
      (1) a common electrode,
      (2) an electroluminescent phosphor layer affixed to said common electrode, and
      (3) a plurality of spaced parallel electrode segments affixed to the surface of said electroluminescent phosphor layer, and
   (c) translator means secured to the flat surface of said substrate, said translator means having a set of output terminals and a plurality of spaced output electrodes each coupled to a corresponding one of said electrode segments, said electrode segments being energized in accordance with the signals applied to said input terminals.

2. A display device for producing an illuminated bar having a length corresponding to the magnitude of an applied binary signal having $m$ bits, said device comprising
   (a) a non-conducting substrate having a narrow edge and a flat surface extending substantially perpendicular to said edge, said narrow edge having upper and lower ends,
   (b) an indicator including
      (1) a common electrode secured to the narrow edge of said substrate,
      (2) an electroluminescent phosphor layer affixed to said common electrode, and
      (3) a plurality of spaced parallel electrode segments affixed to the surface of said electroluminescent phosphor layer, said electrode segments extending in a direction parallel to the ends of said narrow edge, and
   (c) translator means secured to the flat surface of said substrate, said translator means having a set of input terminals for receiving said binary input signal and a plurality of spaced output electrodes each coupled to a corresponding one of said electrode segments, the number of electrode segments energized through said translator being equal to the magnitude of said applied binary signal.

3. A display device for producing an illuminated bar having a length corresponding to the magnitude of an applied binary signal having $m$ bits, said device comprising
   (a) a non-conducting substrate having a narrow edge and a flat surface extending substantially perpendicular to said edge,
   (b) an indicator including
      (1) a common electrode secured to the narrow edge of said substrate,
      (2) an electroluminescent phosphor layer affixed to said common electrode, and
      (3) a plurality of spaced parallel electrode segments affixed to the surface of said electroluminescent phosphor layer, and
   (c) translator means secured to the flat surface of said substrate, said translator means including
      (1) a first group of electrodes comprising an input section for receiving said binary input signal and an output section, the electrodes in said output section each being electrically connected to a corresponding one of said electrode segments,
      (2) a second group of electrodes spaced from said first group of electrodes,
      (3) a non-linear resistance layer interposed between said first and second groups of electrodes, and
      (4) an insulating mask interposed between one of of said electrode groups and said non-linear resistance layer, said mask having openings at predetermined locations for electrically coupling selected portions of said first and second group electrodes through said non-linear resistance layer, the number of electrode segments energized through said translator being equal to the magnitude of said applied binary signal.

4. A display device for producing an illuminated bar having a length corresponding to the magnitude of an applied binary signal having $m$ bits, said device comprising
(a) a non-conducting substrate having a narrow edge and a flat surface extending substantially perpendicular to said edge,
(b) an indicator including
 (1) a common electrode secured to the edge of said substrate,
 (2) an electroluminescent phosphor layer affixed to said common electrode, and
 (3) a plurality of spaced parallel electrode segments affixed to the surface of said electroluminescent phosphor layer, and
(c) a translator secured to the flat surface of said substrate, said translator including
 (1) a first group of coplanar electrodes comprising an input section for receiving said binary input signal, the electrodes in said input section extending generally in a first direction and an output section extending generally in a second direction substantially perpendicular to said first direction, the electrodes in said output section each being electrically connected to a corresponding one of said electrode segments,
 (2) a second group of coplanar electrodes positioned in a plane parallel to that of said first group of electrodes and spaced therefrom, a first portion of the electrodes in said second group extending in said second direction and passing under said input section and a second portion of the electrodes in said second group extending in said first direction and passing under said output section,
 (3) a non-linear resistance layer interposed between said first and second groups of electrodes, and
 (4) an insulating mask interposed between one of said electrode groups and said non-linear resistance layer, said mask having openings at predetermined locations for electrically connecting selected portions of said first and second group electrodes through said non-linear resistance layer, the number of electrode segments energized through said translator being equal to the magnitude of said applied binary signal.

5. A display device for producing an illuminated bar having a length corresponding to the magnitude of an applied binary signal having $m$ bits, said device comprising
(a) a non-conducting substrate having a narrow edge and a flat surface extending substantially perpendicular to said edge, said narrow edge having upper and lower ends,
(b) an indicator including
 (1) a common electrode secured to the narrow edge of said substrate,
 (2) an electroluminescent phosphor layer affixed to said common electrode, and
 (3) a plurality of spaced parallel electrode segments affixed to the surface of said electroluminescent phosphor layer, said electrode segments extending in a direction parallel to the ends of said narrow edge, and
(c) a translator secured to the flat surface of said substrate, said translator including
 (1) a first group of coplanar electrodes comprising an input section having $m$ electrodes for receiving said binary input signal, the electrodes in said input section extending generally in a first direction, and an output section having a maximum of $2^m-1$ electrodes extending generally in a second direction substantially perpendicular to said first direction, the electrodes in said output section each being electrically connected to a corresponding one of said electrode segments,
 (2) a second group consisting of a maximum of $2^m-1$ coplanar electrodes positioned in a plane parallel to that of said first group of electrodes and spaced therefrom, a first portion of the electrodes in said second group extending in said second direction and passing under said input section and a second portion of the electrodes in said second group extending in said first direction and passing under said output section,
 (3) a non-linear resistance layer interposed between said first and second groups of electrodes, and
 (4) an insulating mask interposed between one of said electrode groups and said non-linear resistance layer, said mask having openings therein for electrically connecting each of the electrodes in said second group to at least one corresponding electrode in said output section, said mask having further openings therein for electrically connecting each of the electrodes in said second group to at least one input electrode through said non-linear layer,
(d) means for applying a voltage source between each of the electrodes in said second group and said common electrode, and
(e) means for applying voltages representing said binary input signals between each of said input electrodes and said common electrode, the number of electrode segments energized being proportional to the magnitude of the binary number represented by said input signals.

6. A display device for producing an illuminated bar having a length corresponding to the magnitude of an applied binary signal having $m$ bits, said device comprising
(a) a non-conducting substrate
(b) an indicator including
 (1) a common electrode secured to said substrate,
 (2) an electroluminescent phosphor layer affixed to said common electrode, and
 (3) a plurality of spaced parallel electrode segments affixed to the surface of said electroluminescent phosphor layer, and
(c) translator means secured to said substrate, said translator means including
 (1) a first group of electrodes comprising an input section for receiving said binary input signal and an output section, the electrodes in said output section each being electrically connected to a corresponding one of said electrode segments,
 (2) a second group of electrodes spaced from said first group of electrodes,
 (3) a non-linear resistance layer interposed between said first and second groups of electrodes, and
 (4) an insulating mask interposed between one of said electrode groups and said non-linear resistance layer, said mask having openings at predetermined locations for electrically coupling selected portions of said first and second group electrodes through said non-linear resistance layer, the number of electrode segments energized through said translator being equal to the magnitude of said applied binary signal.

7. A display device for producing an illuminated bar having a length corresponding to the magnitude of an applied binary signal having $m$ bits, said device comprising
(a) a non-conducting substrate having a narrow edge and a flat surface extending substantially perpendicular to said edge, said narrow edge having upper and lower ends,
(b) an indicator including
(1) a common electrode secured to the narrow edge of said substrate,
(2) an electroluminescent phosphor layer affixed to said common electrode, and
(3) a plurality of spaced parallel electrode segments affixed to the surface of said electroluminescent phosphor layer, said electrode segments extending in a direction parallel to the ends of said narrow edge, and
(c) a translator including
(1) an interconnecting electrode group comprising a maximum of $2^m-1$ coplanar parallel, spaced electrodes secured to the flat surface of said substrate, a first portion of each of the electrodes in said group extending in a first direction parallel to the edge of said substrate and a second portion of each of the electrodes in said group extending in a second direction perpendicular to the edge of said substrate,
(2) an insulating mask affixed to said electrode group, said mask having openings therein at predetermined location,
(3) a non-linear resistance layer affixed to said insulating mask,
(4) $m$ coplanar, parallel spaced input electrodes extending in said first direction and crossing over the second portion of said interconnecting electrode group affixed to said non-linear resistance layer, said input electrodes being selectively electrically coupled to the second portion of said interconnecting electrode group through the openings in said insulating mask, and
(5) an output electrode group comprising a maximum of $2^m-1$ coplanar parallel spaced electrodes extending in said second direction affixed to said non-linear resistance layer, each of said output electrodes being electrically connected to a corresponding electrode segment, said output electrodes being selectively coupled to said interconnecting electrode group through the openings in said insulating mask,
(d) a plurality of linear resistors, one end of each of said resistors being connected to a corresponding electrode in said interconnecting electrode group,
(e) a voltage source connected between the other ends of said linear resistors and said common electrode, and
(f) switching means for selectively coupling each of said input electrodes to said common electrode in accordance with said binary input signals, the number of electrode segments energized by said voltage source corresponding to the magnitude of the binary number represented by said input signals.

8. A display device as defined in claim 7 wherein a shunting electrode is affixed to the flat surface of said substrate, said shunting electrode being electrically connected to said common electrode and electrically coupled through said non-linear resistance layer to said output electrodes.

9. A display device for producing an illuminated bar having a length corresponding to the magnitude of an applied binary signal having $m$ bits, said device comprising
(a) a non-conducting substrate having a narrow edge and first and second flat surfaces perpendicular to said edge, said narrow edge having upper and lower ends,
(b) an indicator including
(1) a common electrode secured to the narrow edge of said substrate,
(2) an electroluminescent phosphor layer affixed to said common electrode, and
(3) a plurality of spaced parallel electrode segments affixed to the surface of said electroluminescent phosphor layer, said electrode segments extending in a direction parallel to the the ends of said narrow edge and perpendicular to said first and second flat surfaces, and
(c) translator means secured to a flat surface of said substrate, said translator means having a set of input terminals for receiving said binary input signal and a plurality of spaced output electrodes each coupled to a corresponding one of said electrode segments, the number of electrode segments energized through said translator being equal to the magnitude of said applied binary signal.

No references cited.

JOHN W. HUCKERT, *Primary Examiner.*